United States Patent
Kono

(10) Patent No.: US 6,804,065 B2
(45) Date of Patent: Oct. 12, 2004

(54) WORKING METHOD OF DIE FOR USE FOR FRESNEL LENS, CUTTING TOOL FOR USE WITH THE WORKING METHOD, DIE WORKED THROUGH EXECUTION OF THE WORKING METHOD, AND FRESNEL LENS WORKED FROM THE DIE

(75) Inventor: Yoshihiro Kono, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 0 days.

(21) Appl. No.: 10/006,458

(22) Filed: Dec. 6, 2001

(65) Prior Publication Data

US 2002/0071187 A1 Jun. 13, 2002

(30) Foreign Application Priority Data

Dec. 11, 2000 (JP) .................................... 2000-375454

(51) Int. Cl.[7] .................................................. G02B 3/08
(52) U.S. Cl. .................................................... 359/742
(58) Field of Search ........................... 359/742, 741, 359/743

(56) References Cited

U.S. PATENT DOCUMENTS

| | | | | | |
|---|---|---|---|---|---|
| 3,872,749 | A | * | 3/1975 | Plummer | 82/12 |
| 4,456,344 | A | * | 6/1984 | Bordignon | 359/742 |
| 5,638,212 | A | * | 6/1997 | Meyers et al. | 407/118 |
| 6,491,481 | B1 | * | 12/2002 | Border et al. | 407/53 |

* cited by examiner

Primary Examiner—Georgia Epps
Assistant Examiner—Alicia M. Harrington
(74) Attorney, Agent, or Firm—Ladas & Parry LLP

(57) ABSTRACT

A method for working a die for use with a Fresnel lens, the method being intended to work in an original die plate having a Fresnel molding groove with wall surfaces corresponding to a lens surface and a non-lens surface of the Fresnel lens. A cutting tool having one piece of edge line continuing to a blade end is constructed as a cutting edge. The blade end has formed therein a notched portion which connects the one piece of edge line and another piece of edge line. Thereby, while a relative rotating movement around a center line of the die is made between the cutting tool and the original die plate, the cutting tool is fed into the original die plate with the cutting edge being used as the leading blade.

3 Claims, 6 Drawing Sheets

WORKING METHOD OF DIE FOR USE FOR FRESNEL LENS, CUTTING TOOL FOR USE WITH THE WORKING METHOD, DIE WORKED THROUGH EXECUTION OF THE WORKING METHOD, AND FRESNEL LENS WORKED FROM THE DIE

BACKGROUND OF THE INVENTION

1. Field of the Invention

The present invention relates to a working method of a die for use for a Fresnel lens, a cutting tool for use with the working method, a die worked through the execution of the working method, and a Fresnel lens worked from the die.

2. Description of the Related Art

A Fresnel lens is the one that is obtained by repeatedly forming a lens surface having a fine width in the radial direction with the optical axis of the lens as a whole being set to be the center. This Fresnel lens is manufactured utilizing the die. As the dies there are a mother die having formed therein by cutting a number of Fresnel molding grooves each for forming a corresponding lens surface and a non-lens surface located between the adjacent lens surfaces, a master die molded from the mother die, and a stamper die molded from the master die. The master die is formed in such a way as to cause a transfer thereto of the Fresnel molded surface of the surface of the mother die having had formed therein a number of the Fresnel molded grooves. The stamper is formed in such a way as to cause a transfer thereto, again, of the Fresnel molded surface transferred to the surface of that master. Accordingly, the Fresnel molded surface of the surface of the stamper is complementary in configuration for the Fresnel surface of the Fresnel lens having formed therein the lens surface thereof. Onto the Fresnel molded surface of the stamper is caused to flow a molten state of UV-curable resin to a predetermined thickness. Then onto there ultraviolet rays are radiated to thereby cure the resin. Then the thus-cured resin is exfoliated from the stamper, whereby the Fresnel lens is formed.

The above-described mother die is formed into a predetermined configuration by performing cutting work based on the utilization of a diamond-made cutting tool as a cutting tool. However, because the blade end of the conventional cutting tool is formed sharpened, it sometimes happened that a chip-off of the tip occurred with the result that the service life of the cutting tool became short.

SUMMARY OF THE INVENTION

Thereupon, the present invention has an object to provide a working method which can prevent the decrease in the service life of the cutting tool due to the chip-off of it and a cutting tool for use with the working method. Another object of the present invention is to provide a working method and die that can add additional value to the Fresnel lens through the utilization of a technique for preventing the chip-off of the tip.

The present invention solves the above-described problems by the working method that will be mentioned below, etc.

The working method of the present invention is the one that is a working method of a die for use for a Fresnel lens, which is intended to work in an original die plate a Fresnel molding groove having wall surfaces corresponding to a lens surface and a non-lens surface of the Fresnel lens, wherein there is used a cutting tool in which one piece of edge line continuing to a blade end is constructed as a cutting edge; and the blade end has formed therein a notched portion which connects the one piece of edge line and another piece of edge line, whereby, while a relative rotating movement around a center line of the die is being made between the cutting tool and the original die plate, the cutting tool goes on to be fed into the original die plate with the cutting edge being used as the leading blade so that the wall surface corresponding to the non-lens surface of the Fresnel molding groove is gradually cut from an upper end thereof by the notched portion.

According to this working method, the notched portion is provided at the blade end of the cutting tool, and the wall surface corresponding to the non-lens surface is cut utilizing that notched portion. Therefore, the mechanical strength of the blade end increases with the result that the frequency at which the tip of the cutting tool gets chipped off decreases. It is thereby possible to prolong the service life of the cutting tool. Since the wall surface of the Fresnel molding groove is cut by the notched portion, it is possible to control the configuration properties such as the surface roughness, of that wall surface in conformity with the configuration of the notched portion. For example, it is possible to form by the notched portion a concavities/convexities configuration of cutting trace in the wall surface corresponding to the non-lens surface. In this case, a concavities/convexities portion resulting from the cutting trace is transferred to the non-lens surface of the Fresnel lens, with the result that the surface roughness of that non-lens surface becomes increased. Resultantly, the non-lens surface is constructed as a frosted-glass configuration of mat surface. Thus, the emission of stray light within the lens from the non-lens surface is suppressed with the result that the contrast is improved.

The cutting tool of the present invention is the one that is intended to work in an original die plate a Fresnel molding groove having wall surfaces which respectively correspond to a lens surface and a non-lens surface of a Fresnel lens, the cutting tool having a blade end and a pair of edge lines continuing to the blade end, whereby one piece of edge line is constructed as a cutting edge for cutting the wall surface corresponding to the lens surface of the Fresnel molding groove; and the blade end has provided therein a notched portion in such a way as to connect the one piece of edge line and another piece of edge line. According to this cutting tool, it is possible to realize the above-described working method.

The die of the present invention is the one that has a Fresnel molding groove which has been worked by the above-described working method. According to this die, it is possible to control the configuration properties of the wall surface corresponding to the non-lens surface by the notched portion of the cutting tool and thereby impart an optimum configuration to the non-lens surface of the Fresnel lens.

In the die of the present invention, in the wall surface corresponding to the non-lens surface of the Fresnel molding groove there may exist a concavities/convexities configuration of cutting trace which has been formed by the notched portion of the cutting tool having passed over that wall surface. If such is so done, it is possible to form the concavities/convexities portion corresponding to the manufactured based on the die to thereby increase the surface roughness of that non-lens surface.

The Fresnel lens of the present invention is the one that comprises lens surfaces and non-lens surfaces, wherein there is provided on at least one of no-lens surfaces a concavities/convexities portion based on a cutting trace which is formed at the time of working a die. According to this Fresnel lens, the non-lens surface is constructed as a frosted-glass configuration of mat surface. Thereby, the emission from the non-lens surface of stray light within the lens is suppressed with the result that the contrast is improved.

DESCRIPTION OF THE PREFERRED EMBODIMENTS

Figure 2:
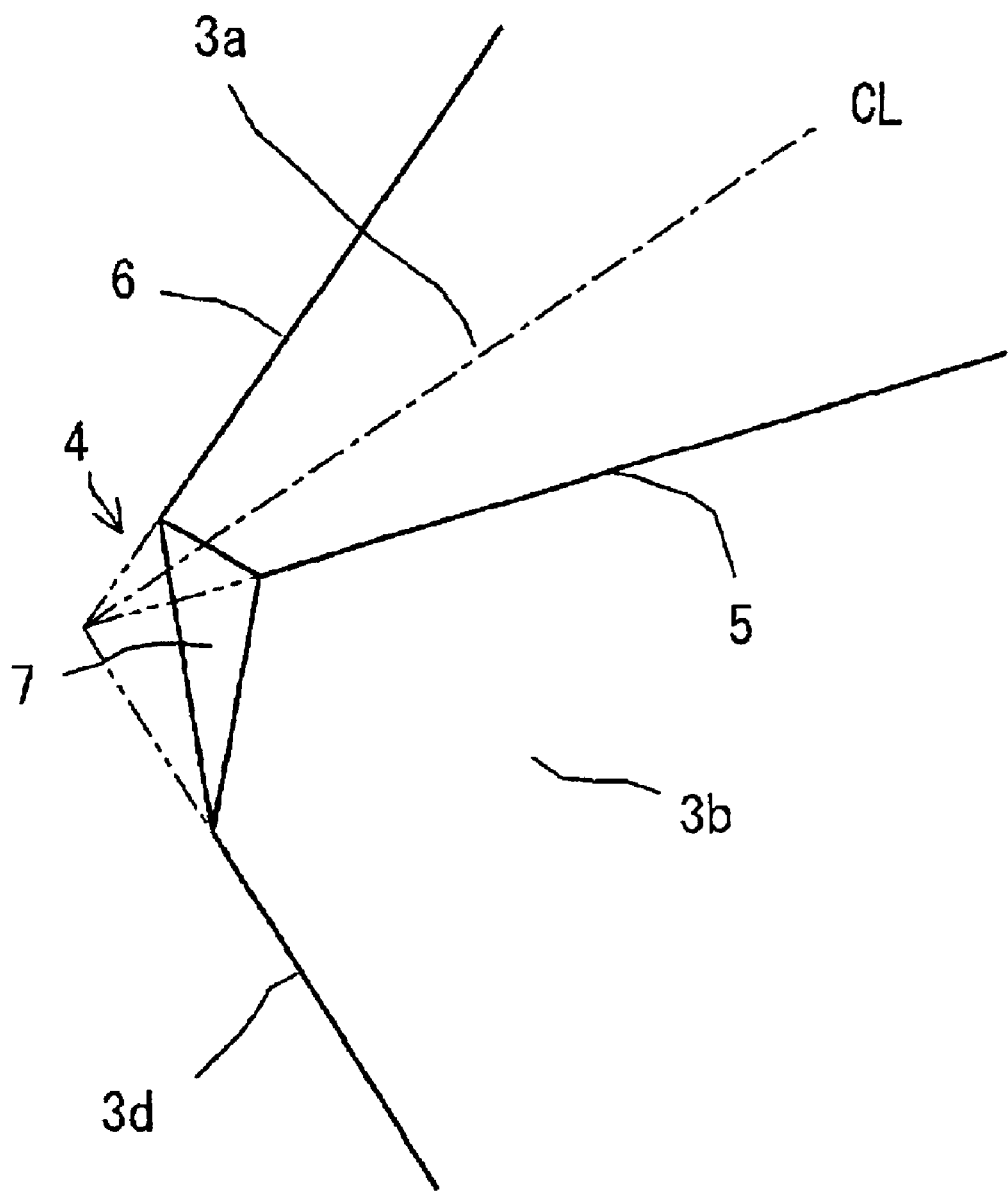
FIG. 2 is a perspective view of a tip end portion of the cutting tool.
Figure 3A:
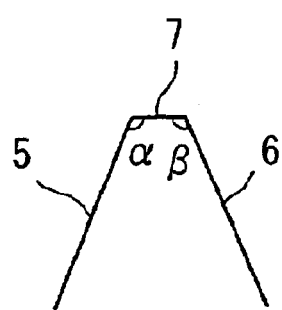
FIGS. 3A to 3C are views each illustrating a modification of the notched portion that is formed on the blade end.
Figure 3B:
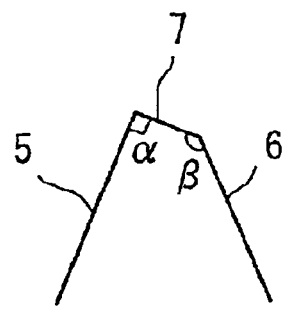
Figure 3C:
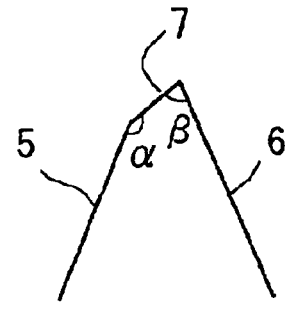
Figure 4A:
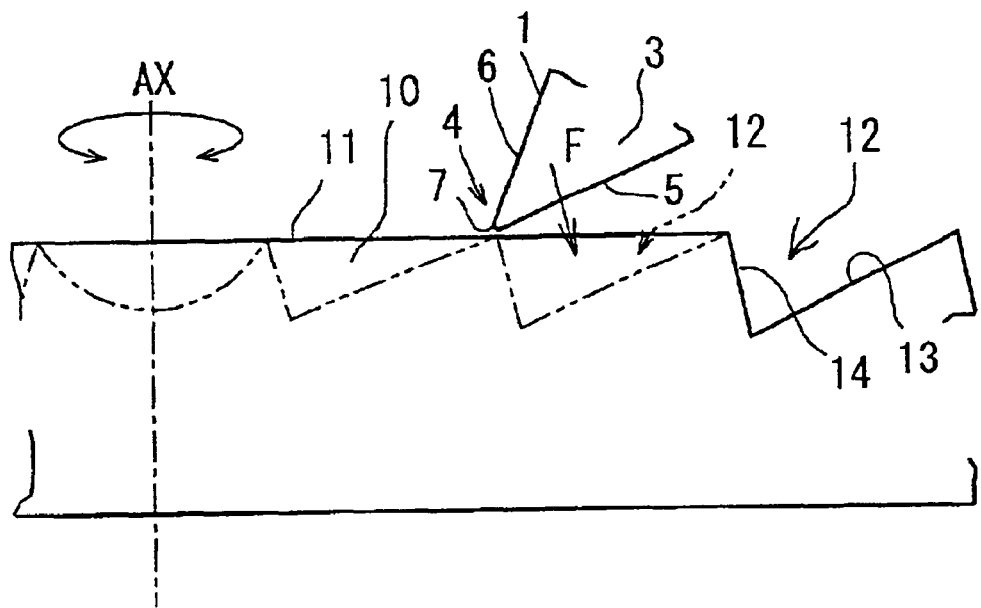
FIGS. 4A and 4B are views each illustrating the state where a die for use for a Fresnel lens is cut with the cutting tool of FIG. 1.
Figure 4B:
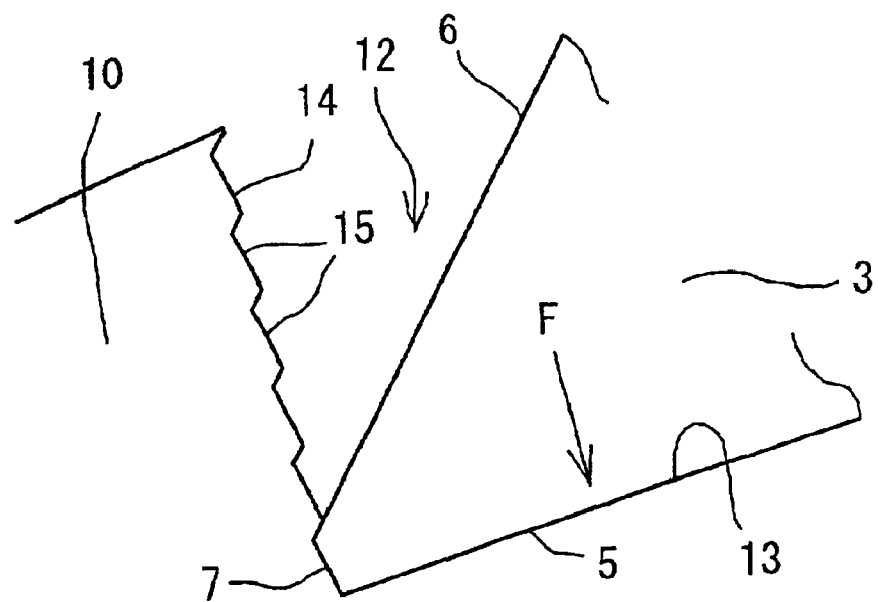

FIG. 1 to FIG. 3C illustrate a cutting tool according to an embodiment of the present invention and FIGS. 4A and 4B illustrate the state where a die for use for the molding of a Fresnel lens is being worked by cutting an original plate with that cutting tool.

First, explaining from the cutting tool, the cutting tool shown in FIGS. 1A to 1D is constructed as a turning tool 1 that is used on a lathe, having a holder 2 and a tip 3. The holder 2 is constructed of a main body 2a that is constructed of a high-rigidity material such as carbon steel and a tip-attaching portion 2b that is constructed of tungsten and that is integrated therewith. The main body 2a may be integrated with a shank (not illustrated) for attaching the turning tool to the lathe, or may be the one that is detachably attached to the shank with the use of fastening means such as a bolt.

The tip 3 is made of diamond and is bonded to the tip-attaching portion 2b of the holder 2 by the use of the known methods such as crimping. The tip 3 has a blade end 4 and a pair of edge lines 5, 6 connecting thereto. One edge line 5 is constructed as a cutting edge, and an upper surface 3a functions as a cutting face with respect to that cutting edge. The included angle θ that is given as the intersection angle of the edge lines 5 and 6 is set to 45°. Provided, however, that the included angle θ is not limited to 45°. As illustrated in FIGS. 1C and 1D, both side surfaces 3b, 3c of the tip 3 each intersects the cutting face 3a at an angle that is somewhat smaller than 90°, e.g. 87°, with a corresponding one of the edge lines 5, 6 being located at the boundary between the two 3a and 3b or 3c.

Figure 1A:
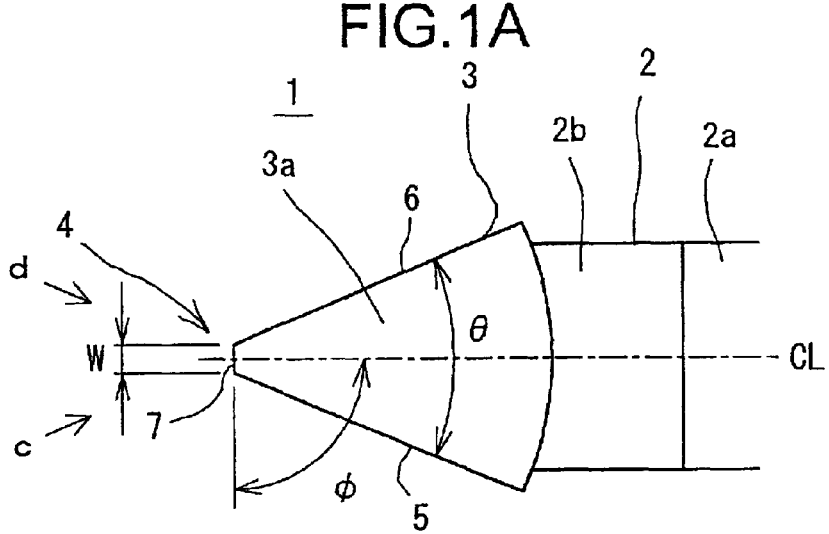
FIGS. 1A to 1D are views illustrating a cutting tool according to an embodiment of the present invention, FIG. 1A being a plan view thereof, FIG. 1B being a right side view that has been taken when the blade end side is considered as the front side, FIG. 1C being a view illustrating the state at the time when the left side surface is looked at from the blade end side as indicated by the arrow c, and FIG. 1D being a view illustrating the state at the time when the right side surface is looked at from the blade end side as indicated by the arrow d.
Figure 1B:
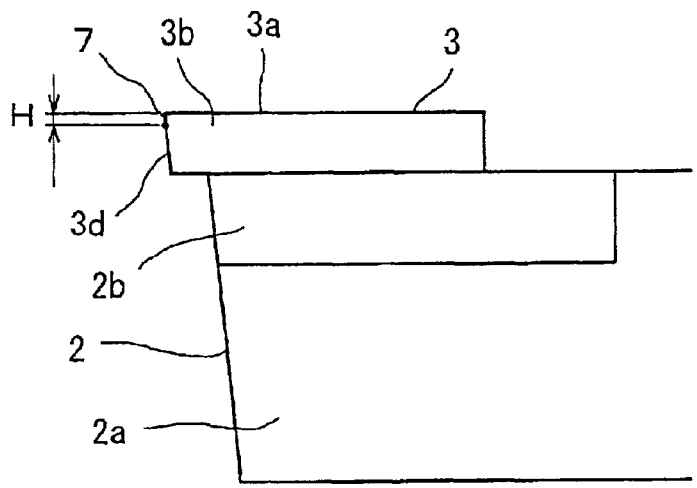
Figure 1C:
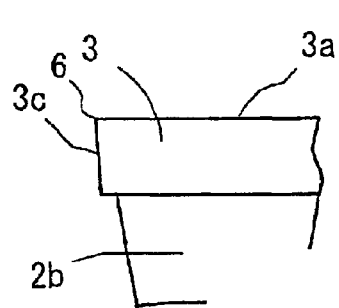
Figure 1D:
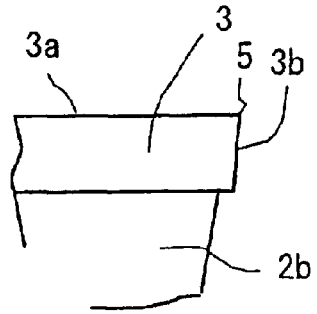

As illustrated in FIGS. 1A and 1B, the blade end 4 of the tip 3 has formed therein a notched portion 7 in such a way as to connect a pair of the edge lines 5 and 6 to each other. As illustrated in FIG. 2 as well, the notched portion 7 is formed by notching an apex portion to be defined by merging an edge line 3d at which the side surfaces 3b, 3c intersect each other with the edge lines 5, 6 on the side of the cutting face 3a along a direction perpendicular to a bisector CL of the included angle θ. A width W (FIG. 1A) on the cutting face 3a of the notched portion 7 is set to a range of 2 μm or more.

An angle Φ that is defined by the bisector CL of the included angle θ with respect to the notched portion 7 is set at 90° twice as great as the included angle θ as one example. Namely, in the example of FIG. 1A, the notched portion 7 intersects each edge line 5, 6 at an equal angle to it. Provided, however, that the angle Φ is not limited to 90° but can be changed variously. For instance, as illustrated in FIG. 3A, the angle α at which the edge line 5 of the cutting edge side and the notched portion 7 intersect each other may be made greater than the angle β at which the edge line 6 and the notched portion 7 intersect each other. Or, as illustrated in FIG. 3B, the angle α at which the edge line 5 of the cutting edge side and the notched portion 7 may be made smaller than the angle β at which the edge line 6 and the notched portion 7 intersect each other. Incidentally, in FIG. 3B, there is illustrated an example wherein the angle α at which the edge line 5 and the notched portion 7 intersect each other has been set to 90°. Also, although in FIG. 3A each of the angles α and β is set to be an obtuse angle, as illustrated in FIG. 3C the intersection angle α between the edge line 5 of the cutting edge side and the notched portion 7 may be set to be an obtuse angle while the intersection angle β between the edge line 6 and the notched portion 7 is set to be an acute angle.

Next, an explanation will be given of the working method of a die for manufacture of a Fresnel lens that uses the above-described turning tool 1. FIG. 4A illustrates a state of manufacturing a die by working an original die plate 10 with the use of the turning tool 1. The original die plate 10 is the one that uses as the base material a relatively soft quality of metal such as brass. The original die plate 10 is rotated about a die center line AX while being mounted on a main spindle (not illustrated) of the lathe. The turning tool 1 is fed into the original die plate 10 from a surface 11 of it with the cutting edge 5 being set to be the lead. At this time, the direction of the cutting edge 5 is set to be in parallel with the wall surface 13 corresponding to the lens surface of the Fresnel molding groove 12 that is to be formed in the original die plate 10. Also, the blade end 4 is positioned so that the wall surface 14 corresponding to the non-lens surface of the Fresnel molding groove 12 may be worked by the notched portion 7 formed thereon. And the direction of the feed of the tip 3 (indicated by the arrow F in FIG. 4A) is set to be in parallel with the wall surface 14 corresponding to the non-lens surface of the Fresnel molding groove 12. Provided, however, that since the angle of the wall surface 14 differs in units of the Fresnel molding groove 12, the direction of the feed of the turning tool 1 is changed each time the Fresnel molding groove 12 is worked.

Figure 5:
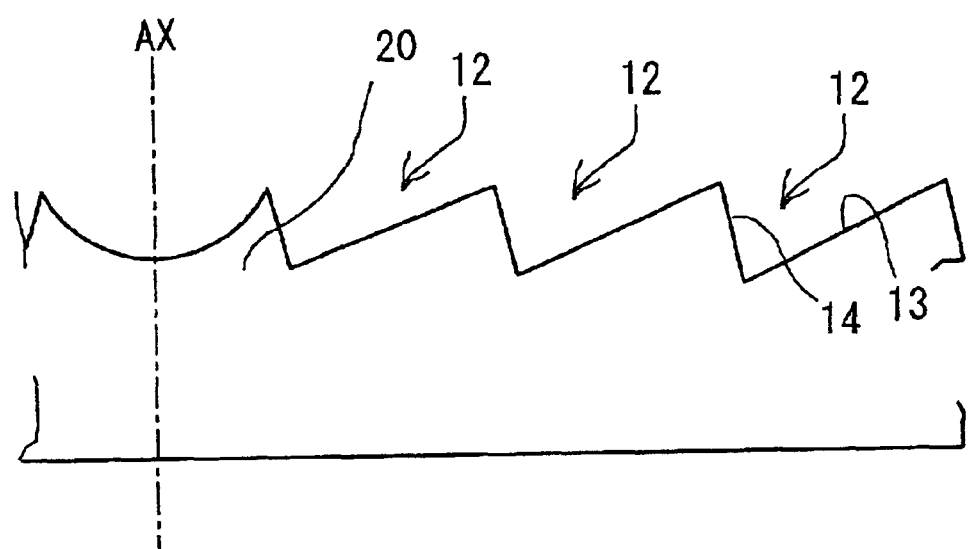
FIG. 5 is a view illustrating a main part of the die that has been manufactured with the working method of FIG. 4.

By cutting the turning tool 1 into the original die plate 10 in the above-described way, the wall surface 14 corresponding to the non-lens surface of the Fresnel molding groove 12 is gradually cut from the upper end by the notched portion 7. And, as illustrated in FIG. 4B, the cutting edge 5 is cut in by the amount corresponding to the depth of the Fresnel molding groove 12 and as a result of this the wall surface 13 corresponding to the lens surface is formed, whereby the Fresnel lens molding groove 12 is complete. Through the repetition of such working in regard to every Fresnel molding groove 12, the die 20 illustrated in FIG. 5 is complete.

Figure 6A:
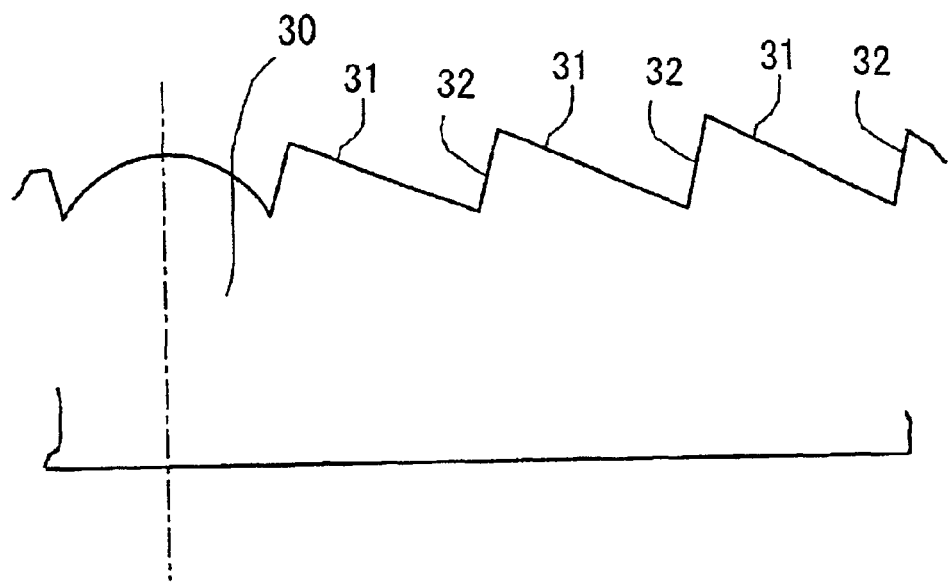
FIGS. 6A and 6B are views each illustrating a main part of the Fresnel lens that has been manufactured with the use of the die of FIG. 5.

The die 20 that has been manufactured through cutting in this way is the so-called "mother die". By sequentially transferring the configuration of that die, the dies that are called "master die" and "stamper die" are manufactured. And, by causing resin to flow onto the surface of the stamper and curing it, the Fresnel lens 30 of FIGS. 6A and 6B, the configuration of that is complementary for that of the die 20, is manufactured. The lens surface 31 of the Fresnel lens 30 corresponds to the wall surface 13 of the Fresnel molding surface 12 formed in the die 20 while the non-lens surface 32 corresponds to the wall surface 14.

Figure 6B:
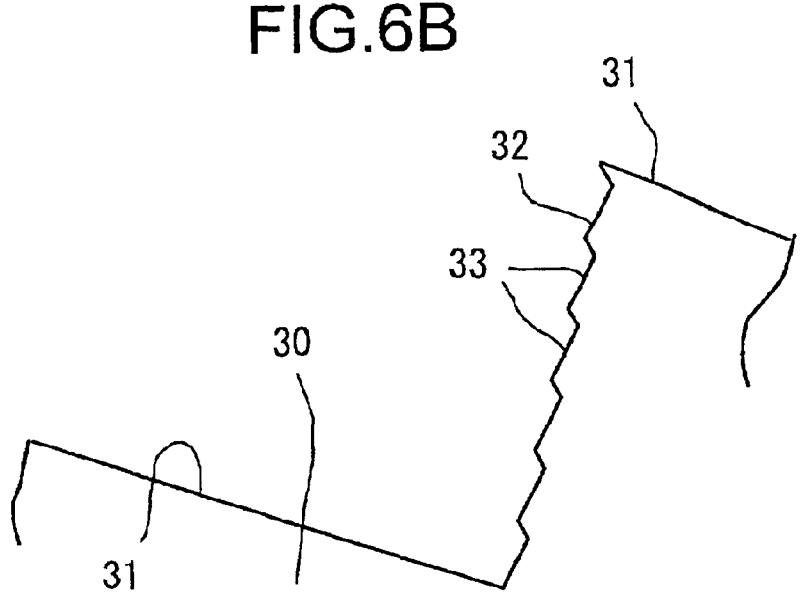

In case having worked the Fresnel molding groove 12 with the use of the above-described working method, as illustrated in FIG. 4B, the wall surface 14 of the Fresnel molding groove 12 has formed therein a concavities/convexities configuration of cutting traces 15 . . . 15 through the passage of the notched portion 7 in the vertical direction (the feed direction of the turning tool 1). Accordingly, the non-lens surface 32 of the Fresnel lens of FIG. 6A manufactured according to the die 20, as illustrated in FIG. 6B, has formed therein a number of the concavities/convexities portion 33 . . . 33 correspondingly to the cutting traces 15. For this reason, the surface roughness of the non-lens surface 32 becomes coarse with the result that the non-lens surface 32 comes to be constructed as a frosted glass-like what is called "mat surface". Resultantly, the emission from the non-lens surface 32 of stray light repeating the reflection within the lens is obstructed, with the result that the contrast is improved.

Additionally, the pitch of the cutting traces can be adjusted in correspondence with the amount of the feed of the turning tool 1 per full rotation of the original die plate 10 while the configuration of the cutting trace 15 can be variously changed correspondingly to the configuration of the notched portion 7. The surface roughness of the die wall surface 14 resulting from the cutting traces 15 preferably is set to have a pitch of appropriately 3 to 4 $\mu$m or so.

The present invention is not limited to the above-described embodiment but permits various changes or modifications to be made to execute. For example, as the cutting tool, various kinds of base materials such as carbide that suit the metal working maybe used, not limited to the diamond-made tip. Base material of which the original die plate is made may also be variously altered. In the embodiment, the cutting-worked die has been determined to be the mother die, and, the master and stamper dies are sequentially formed from that mother die. However, the master and stamper dies may be abolished, and the surface of the die for use as the mother die may be worked into the same configuration as that of the surface of the Fresnel lens.

As has been explained above, according to the present invention, the construction has been made in the way of providing the notched portion on the blade end of the cutting tool and of, using that notched portion, cutting the wall surface corresponding to the non-lens surface of the die. Therefore, the frequency at which the tip is chipped off decreases as a result of the increase in the mechanical strength of the blade end. Resultantly, it is possible to prolong the service life of the cutting tool. In addition, because scraping off the wall surface of the Fresnel molding groove by the notched portion, it is possible to control the configuration properties such as the surface roughness of that wall surface correspondingly to the configuration of the notched portion. Accordingly, it is possible, by forming a concavities/convexities configuration of cutting traces in the non-lens surface, to, in the Fresnel lens as finally manufactured, more roughen the surface of the non-lens surface and thereby construct as a mat surface. It is thereby possible to suppress the emission from the non-lens surface of stray light within the lens to thereby improve the contrast.

What is claimed is:

1. A working method of a die for use for a Fresnel lens, the method being intended to work in an original die plate a Fresnel molding groove having wall surfaces corresponding to a lens surface and a non-lens surface of the Fresnel lens, wherein there is used a cutting tool in which one piece of edge line continuing to a blade end is constructed as a cutting edge;

and the blade end has formed therein a notched portion which connects the one piece of edge line and another piece of edge line, whereby while a relative rotating movement around a center line of the die is being made between the cutting tool and the original die plate, the cutting tool goes on to be fed into the original die plate with the cutting edge being used as a leading blade so that the wall surface corresponding to the non-lens surface of the Fresnel molding groove is gradually cut from an upper end thereof by the notched portion;

wherein a concavities/convexities configuration of cutting trace is formed in the wall surface by the notched portion, which makes the non-lens surface of the Fresnel lens be constructed in a frosted glass-like, mat surface configuration.

2. A die for working a Fresnel lens, comprising a Fresnel molding grooves which has been worked by the working method of claim 1.

3. A Fresnel lens comprising lens surfaces and non-lens surfaces, wherein there is provided on at least one of the non-lens surfaces a concavities/convexities portion based on a cutting trace which is formed at the time of working a die, and the concavities/convexities portion makes each non-lens surface be constructed in a frosted glass-like, mat surface configuration.

\* \* \* \* \*